(12) United States Patent
Duch et al.

(10) Patent No.: US 11,745,539 B2
(45) Date of Patent: Sep. 5, 2023

(54) WHEEL HUB ASSEMBLY PROVIDED WITH AN INNOVATIVE DEFLECTOR

(71) Applicant: Aktiebolaget SKF, Gothenburg (SE)

(72) Inventors: Daniele Duch, San Gillio (IT); Nikhil Gulhane, Pune (IN)

(73) Assignee: AKTIEBOLAGET SKF

( * ) Notice: Subject to any disclaimer, the term of this patent is extended or adjusted under 35 U.S.C. 154(b) by 845 days.

(21) Appl. No.: 16/718,812

(22) Filed: Dec. 18, 2019

(65) Prior Publication Data

US 2020/0207147 A1 Jul. 2, 2020

(30) Foreign Application Priority Data

Dec. 26, 2018 (IN) .............................. 201841049095

(51) Int. Cl.
*F16C 33/80* (2006.01)
*B60B 27/00* (2006.01)
*B60B 27/06* (2006.01)

(52) U.S. Cl.
CPC ........ *B60B 27/0073* (2013.01); *F16C 33/805* (2013.01); *B60B 27/06* (2013.01); *B60B 2900/5114* (2013.01)

(58) Field of Classification Search
CPC ...... F16C 19/386; F16C 33/80; F16C 33/805; F16C 2326/02; B60B 27/0073; B60B 27/06; B60B 27/065
See application file for complete search history.

(56) References Cited

U.S. PATENT DOCUMENTS

| | | | |
|---|---|---|---|
| 8,500,338 B2* | 8/2013 | Walter | F16C 33/805 384/488 |
| 2001/0000713 A1* | 5/2001 | Nakamura | F16C 33/7876 324/207.25 |
| 2003/0152302 A1* | 8/2003 | Chinitz | F16C 33/723 384/544 |
| 2005/0084193 A1* | 4/2005 | Chinitz | F16C 33/723 384/537 |
| 2008/0073854 A1* | 3/2008 | Ishikawa | F16J 15/3264 277/358 |
| 2008/0199120 A1 | 8/2008 | Torii et al. | |
| 2011/0062772 A1* | 3/2011 | White | B60B 27/001 29/446 |
| 2015/0003766 A1 | 1/2015 | Duch et al. | |
| 2018/0319211 A1 | 11/2018 | Yang | |

OTHER PUBLICATIONS

Office Action for corresponding India Patent Application No. 201841049095 dated Jan. 11, 2023.

* cited by examiner

*Primary Examiner* — Alan B Waits
(74) *Attorney, Agent, or Firm* — Reed Smith LLP

(57) ABSTRACT

A wheel hub assembly for motor vehicles, provided with a first hub, which is stationary, a second hub, which is rotatable, and a bearing unit in turn having a radially outer ring provided with respective radially external raceways, at least one radially inner ring provided with respective radially internal raceways, at least one row of rolling bodies, positioned between the corresponding internal and external raceways, at least one sealing device, positioned on the axially inner side with respect to the at least one row of rolling bodies. A metal deflector configured so as to allow the water to drain and protect the area of the sealing device from the external contaminant is mounted by interference on the rotating hub.

15 Claims, 2 Drawing Sheets

Det. X

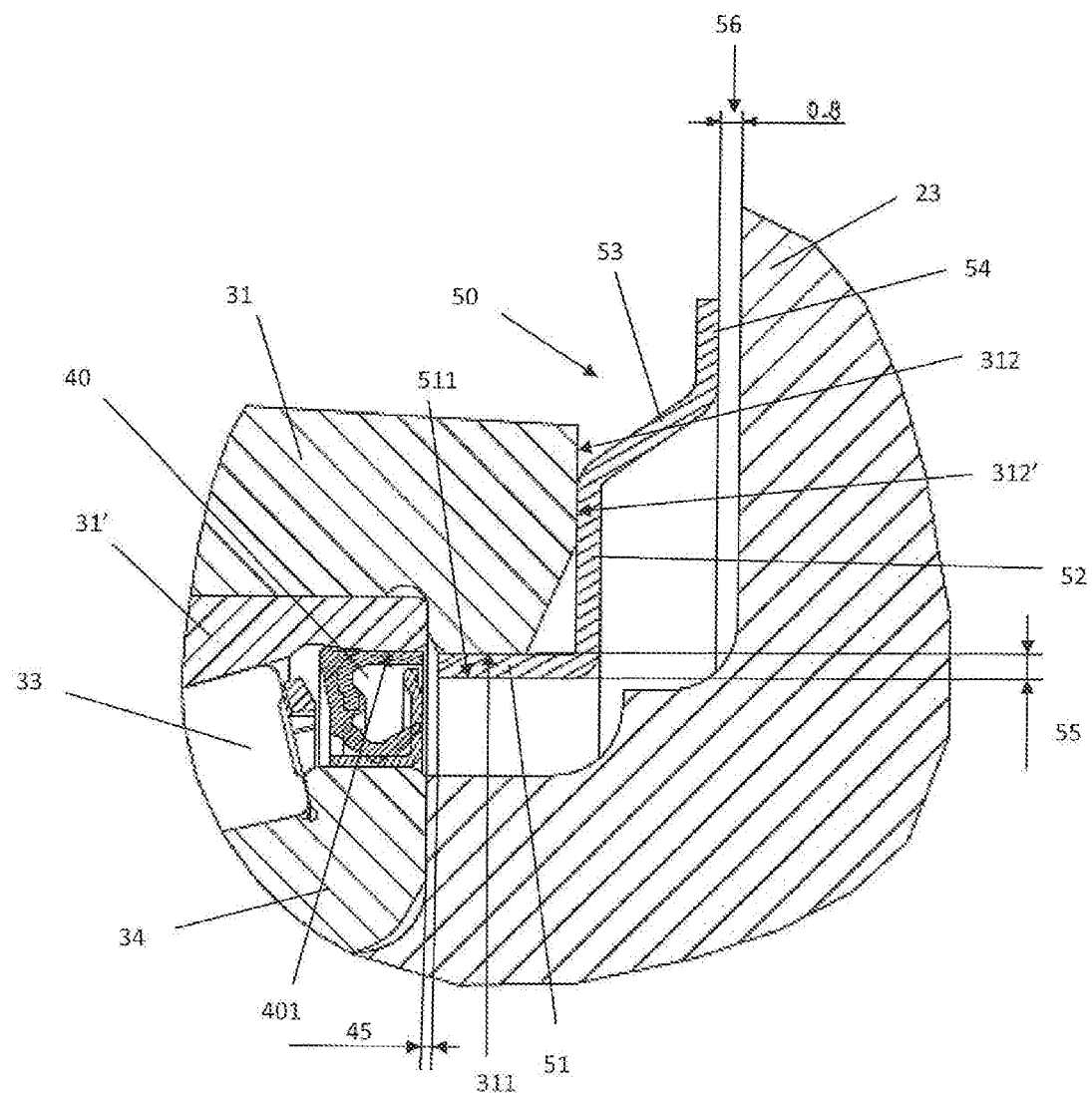
Fig. 2 - Det. X

WHEEL HUB ASSEMBLY PROVIDED WITH AN INNOVATIVE DEFLECTOR

CROSS-REFERENCE TO RELATED APPLICATION

This application claims the benefit of priority to Indian Application No. 201841019095 of the same title filed on Dec. 26, 2018, under 35 U.S.C. § 119, the entire contents of which are incorporated herein by reference.

FIELD

The example embodiments disclosed herein relate to a wheel hub assembly sealing devices.

BACKGROUND

Wheel assemblies for motor vehicles comprising a bearing unit and one or more hubs arranged between rotating elements of a motor vehicle (axle, brake disc, etc.) and fixed elements (for example the suspension upright of the said motor vehicle) are known and commonly used. Depending on the application it may be convenient to design the bearing unit so that the inner ring of the bearing is mounted on the parts of the motor vehicle which perform a rotational movement and therefore is a rotating element, while the outer ring of the bearing is mounted on the stationary parts of the motor vehicle and therefore is also fixed. Vice versa, there exist equally widespread applications in which the outer ring rotates and the inner ring is fixed. In particular, in this second case, the bearing unit is protected on the axially outer side by a seal of the known type comprising a metal support and one or more sealing elements made of elastomeric material.

BRIEF DESCRIPTION OF THE DRAWINGS

The invention will now be described with reference to the accompanying drawings which illustrate a non-limiting example of embodiment thereof, in which:

FIG. 2 is a detail of the wheel hub assembly according to FIG. 1 which shows the geometry of the deflector according to the same embodiment of FIG. 1.

DETAILED DESCRIPTION

Figure 1:
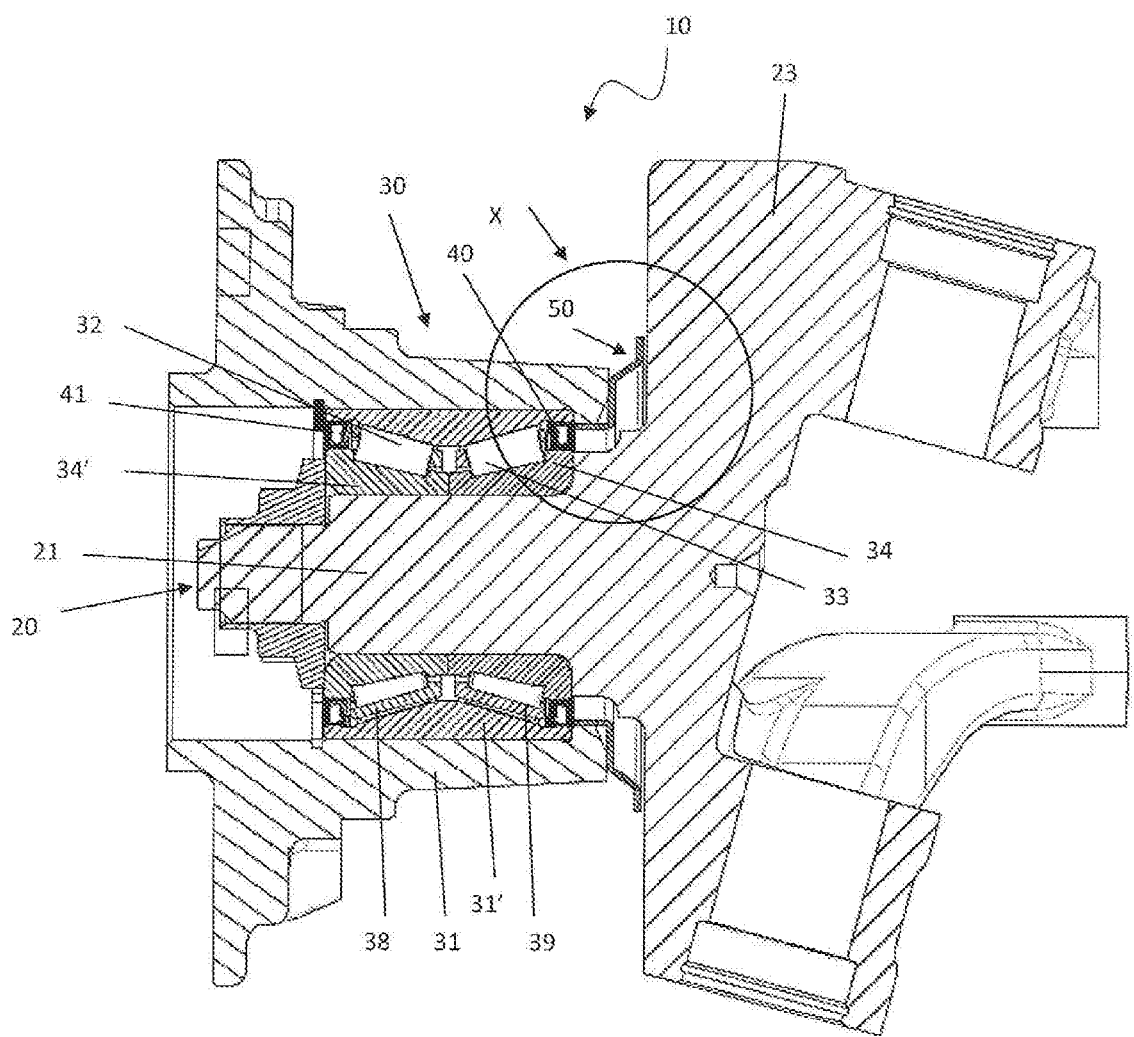
FIG. 1 is a cross-section through a wheel hub assembly according to an example embodiment of the disclosure.

The exemplary embodiments disclosed herein relate to a wheel hub assembly sealing devices. provided with an innovative deflector mounted on a rotating hub on which the radially outer ring of a rolling bearing is fixed, said deflector having the function of protecting the sealing device of said bearing from the contaminants (water, dust, mud, etc.) resulting from the external environment.

Exemplary embodiment in accordance with this disclosure are particularly suitable, although not exclusively, for wheel hub assemblies of motor vehicles, said assemblies being provided with a rolling bearing. These applications comprise both a case where the outer ring of the bearing is rotating, while an inner ring of the bearing is fixed, and an opposite case where an inner ring rotates and an outer ring is fixed. The exemplary embodiments, although it may be used also with rolling bearings in which an inner ring rotates and an outer ring is fixed, is particularly advantageous in opposite cases: being mounted on a rotating element integral with the rotating outer ring, a deflector manages to perform better its protective function in respect of external contaminants, acting not only as a physical barrier, but also making use of centrifugal effects. Exemplary embodiments in accordance with this disclosure are also suitable for any type of rolling body (balls, rollers, tapered rollers, etc.).

With reference now to the aforementioned figures and in particular to FIG. 1, an exemplary wheel hub assembly according to preferred embodiments in accordance with this disclosure is denoted overall by 10, which is applicable generally to any wheel hub assembly, e.g., for motor vehicles.

Assembly 10 comprises a first hub 20 which, preferably but not necessarily, is stationary and a second hub 31 and a bearing unit 30.

In the whole of the present description and in the claims, the terms and expressions indicating positions and orientations such as "radial" and "axial" are understood as referring to the central axis of rotation X of the bearing unit 30. Expressions such as "axially outer" and "axially inner" refer instead to the assembled condition and, in the specific case, preferably refer to a wheel side and, respectively, to a side opposite side to the wheel side.

Bearing unit 30 comprises a radially outer ring 31' which is, preferably but not necessarily, rotatable, provided with respective radially external raceways and mounted on the rotating hub 31, at least one radially inner ring, in this example a pair of radially inner rings 34, 34', which are preferably but not necessarily, stationary, provided with respective radially internal raceways and mounted on the hub 20. The bearing unit 30 is provided finally with two rows of rolling bodies 32, 33, in this example tapered rollers. The axially outer row of rolling bodies 32 is arranged between the radially outer ring 31' and the radially inner ring 34', while the axially inner row of rolling bodies 33 is arranged between the radially outer ring 31' and the radially inner ring 34. For the sake of easier illustration the reference numbers 32, 33 will be used to identify both the single tapered rollers and the row of tapered rollers and in particular 32 will indicate the axially outer row of tapered rollers (or the single tapered roller), while 33 will indicate the axially inner row of tapered rollers (or the single tapered roller). Again for the sake of simplicity, the term "tapered roller" may be used by way of example in the present description and in the attached drawings instead of the more generic term "rolling body" (and likewise the same reference numbers will also be used). It will again be understood that, instead of the tapered rollers, any other rolling body (for example, balls, rollers, needle rollers, etc.) may be used.

According to preferred embodiments which are not shown, but may be easily deduced upon reading this disclosure, a radially outer ring 31' could also be a stationary ring, while a radially inner ring could also be a rotating ring.

Rolling bodies of the rows 32, 33 are kept in position by corresponding cages 38, 39 and are protected from contaminants resulting from the external environment by means of sealing devices 40, 41 which are respectively positioned on the axially inner side and on the top axially on the outside with respect to rolling bodies. These sealing devices comprise an elastomeric portion, having one or more sealing lips, and a metal support.

One aspect of exemplary embodiments is the design and the associated assembly of an innovative deflector 50 having characteristics of protecting the wheel hub assembly and in particular the axially inner sealing device 40 from the contamination associated with external agent such as water, dust, mud and the like.

With reference to FIG. 2, the solution according to an example embodiment of the disclosure therefore comprises a metal deflector 50 which is mounted, preferably, on the rotating hub 31 and, in particular, on the radially inner diameter 311 of the aforementioned rotating hub. Deflector 50 is mounted in an axially inner position with respect to the rotating hub 31.

A possible geometry of the metal deflector comprises a first cylindrical shield 51 adapted to be mounted by interference along the inner diameter 311 of the radially outer ring 31, a second shield 52 shaped as a radially extending circular crown, stably connected to the first cylindrical shield 51 and adapted to provide the deflector with a stop surface against the surface 312—formed as a circular horn—of the rotating hub 31. The deflector advantageously may also comprise a third oblique shield 53, which is integrally connected to the second shield 52 and the function of which will be explained below, as well as a fourth shield 54, which is formed as a radially extending circular crown, stably connected to the third shield 53, in an axially inner position with respect to the other aforementioned shields and able to minimize the access gap exposed to the external contaminants.

A deflector may be made entirely or partially of different materials. By way of example it may be made of metal, plastic or rubber.

A specific form of deflector 50 is such as to allow maximum drainage of the water from the seal and at the same time protect the area of the sealing device from the external contaminant. There are therefore two specific functions of the deflector which are obtained as a result of its geometry and its mounting arrangement. On the one hand, the deflector 50 comprising, as described, a series of shields which are interconnected takes the form of a physical barrier which prevents the entry of contaminants and protects the sealing device 40. On the other hand, owing to mounting thereof on the radially outer ring 31 and therefore on a rotating component, the deflector 50, making use of the effect of the centrifugal forces, performs efficient drainage of the contaminant, preventing it from entering inside the area where the sealing device is located.

The metal deflector 50, once mounted by means of interference on the inner diameter of the radially outer ring 31, must not make contact with the sealing device 40 so as to avoid damaging its elastomeric portion (in the case of front static sealing) and consequently adversely affecting its sealing performance, and also avoid causing incorrect positioning of the sealing device as a result of the contact which occurred during mounting. Therefore it is convenient to provide an axial clearance 45, between sealing device 40 and first cylindrical shield 51 of the deflector 50, which is of a certain size and is preferably greater than 1 mm. This mounting parameter will obviously be superfluous if the geometrical constraints of the wheel hub assembly allow the deflector 50 to be designed with an inner diameter 511 of its first cylindrical shield 51 which is greater than the outer diameter 401 of the sealing device 40. In order to ensure correct and precise positioning of the deflector 50 in relation to the wheel hub assembly 10 and in particular the sealing device 40 it is preferable to ensure that the portion 312' of the surface 312 on which contact between the radially outer ring 31 and second shield 52 of the deflector 50 occurs has a radial extension of not less than 1 mm.

Conveniently also the mounting by means of the interference of the metal deflector 50 on the radially outer ring 31 should be stable and strong. For this purpose the geometrical parameters relating to the press-fitting length and the radial interference between deflector and outer ring must be defined and correlated to each other and obviously also correlated to the thickness of the shields of the deflector 50. According to a preferred example of the dimensional design, for a thickness 55 of the shields of the deflector ranging between 0.5 and 1 mm and a radial interference of between 0.06 and 0.24 mm, conveniently a press-fitting length of the first cylindrical shield 51 on the inner diameter 311 of the rotating hub 31 should be not less than 1.5 mm.

Preferably, the geometry of the deflector must be such as to minimize the access gate 56 situated between the fourth shield 54 and the flange portion 23 of the hub 20 which is exposed to the external contaminants, in order to create also a barrier of the labyrinth type in relation to the same contaminants. Therefore, advantageously, the fourth shield 54 is an axially inner position with respect to the other shields of the deflector 50 and this is obtained by axially distancing the fourth shield 54 from the second shield 52, providing a third intermediate shield 53 situated in between the two aforementioned shields and extending obliquely, i.e. radially and axially. In this way it is possible to reduce the size of the access gate 56 exposed to the external contaminants to axial dimension values equal to about 1.0 mm, or preferably not greater than 0.8 mm, as shown in FIG. 2, or even more preferably not greater than 0.5 mm.

Finally, the presence of the third oblique shield 53 makes the entire structure of the deflector 50 stronger and able to absorb suitably the stresses due to any impacts.

In any case, this does not prevent the deflector from being designed with forms different from that shown, should this be required by the geometry of the surrounding components.

With the solution thus described it is therefore possible to satisfy the type approval tests required for the wheel hub assemblies by the end clients, namely the motor vehicle manufacturers, and reduce the number of the aforementioned assemblies which are returned owing to damage due to the entry of water inside them.

In particularly demanding applications, which are dependent on the geometry defined by the motor vehicle manufacturer, rather than on the quality of the sealing device, the axially outer sealing device is not well protected and specific tests show how it is unable to prevent the entry of water inside the wheel hub assembly. Even more disadvantageously, also the number of withdrawals of motor vehicles which are already in use shows that the known solution is not always effective and, therefore, it is necessary to find a more durable solution.

Considering the geometry of the bearing, the arrangement of the angles and the constraints imposed by motor vehicle manufacturers, the solution is not immediate. There exists, however, the need to design a wheel hub assembly provided with an innovative device for protecting the assembly from external contaminating agents which is devoid of the aforementioned drawbacks.

Some exemplary embodiment provides a wheel hub assembly provided with a deflector which has characteristics of protecting the assembly and in particular its sealing devices from the contamination associated with external agents such as water, dust, mud and the like.

In some exemplary embodiments, a metal deflector which is suitably designed and shaped so as to be compatible with the geometry of the other elements of the wheel hub assembly and which is to be mounted, for example, on a rotating hub on which the radially outer ring of the bearing unit is fixed.

In such exemplary embodiments, and others, the deflectors' form allows maximum drainage of the water from the seal and at the same time protects the sealing area from the external contaminant. Such a deflector has been designed to be mounted on an inner diameter of the rotating hub. It is possible by suitably changing such geometry to design the deflector so that it may be mounted on the outer diameter of the rotating hub.

A deflector according to exemplary embodiment may be used also with rolling bearings in which an inner ring rotates and an outer ring is fixed. Some exemplary embodiments, however, take an opposite approach: a deflect being mounted on an element integral with a rotating outer ring, such a deflector manages better to perform its protective function in relation to external contaminants by acting not only as a physical barrier, but by also making use of centrifugal forces which increase the performance thereof.

Conveniently in some exemplary embodiments, a deflector, once mounted by means of interference on a rotating hub, should not interfere with a sealing device so as not to ruin an elastomeric portion thereof nor adversely affect as a result its sealing performance. In order to achieve this, a residual clearance, after mounting of a deflector, between deflector and sealing device, as well as an amount of an axial surface of a deflector resting on a rotating hub must be suitably determined.

In some embodiments, it is advantageous for an interference mounting of a metal deflector on a rotating hub to be stable and strong and, for this purpose, geometrical parameters relating to the press-fitting length and the radial interference will be suitably defined and correlated to each other.

Preferably, geometry of a deflector must be such as to minimize an access gap exposed to external contaminants in order to create a further barrier of a labyrinth type in relation to such contaminants.

Moreover, geometry of a deflector must be suitably shaped so as to be able to absorb suitably stresses due to any impacts.

In addition to the example embodiments of the disclosure, as described above, it is to be understood that numerous further variants are possible. It must also be understood that said embodiments are only examples and do not limit the subject of the invention, nor its applications, nor its possible configurations. On the contrary, although the description provided above enables the person skilled in the art to implement the example embodiment at least in one of its examples of configuration, it must be understood that numerous variations of the components described are feasible, without thereby departing from the scope of the invention, as defined in the accompanying claims, interpreted literally and/or in accordance with their legal equivalents.

We claim:

1. A wheel hub assembly for motor vehicles comprising:
a stationary first hub,
a rotatable second hub, and
a bearing unit comprising:
a radially outer ring provided with respective radially outer raceways and mounted on the rotatable second hub,
at least one radially inner ring provided with respective radially internal raceways and mounted on the stationary first hub,
at least one row of rolling bodies, positioned between the corresponding internal and external raceways,
at least one sealing device, positioned on the axially inner side with respect to the at least one row of rolling bodies,
wherein on the second hub a metal deflector is mounted by interference and configured to allow water to drain and protect the area of the at least one sealing device from the external contaminant; and
wherein the deflector comprises a first cylindrical shield configured to be mounted by interference on the second hub and radially aligned with the inner diameter of the radially outer ring, a second shield comprising a radially extending flange portion, connected to the first cylindrical shield and configured to provide the deflector with a stop surface against a surface of the radially outer ring, a third oblique shield, integrally connected to the second shield and a fourth shield, connected to the third shield, in an axially inner position with respect to the first shield, the second shield and the third shield.

2. The wheel hub assembly of claim 1, wherein between the at least one sealing device and the first cylindrical shield of the deflector there is an axial clearance having a value greater than 1 mm.

3. The wheel hub assembly of claim 1, wherein the inner diameter of the deflector is smaller than the outer diameter of the at least one sealing device.

4. The wheel hub assembly of claim 1, wherein a portion of the surface on which the contact between the radially outer ring and the second shield of the deflector occurs has a radial development greater than or equal to 1 mm.

5. The wheel hub assembly of claim 1, wherein a thickness of the shields of the deflector is between 0.5 and 1 mm, a radial interference is between 0.06 and 0.24 mm and a press-fitting length of the first cylindrical shield in the inner diameter of the radially outer ring has a value greater than or equal to 1.5 mm.

6. The wheel hub assembly of claim 1, wherein the fourth shield is fixed in an axially inner position with respect to the other shields of the deflector, said position being obtained by axially distancing the fourth shield from the second shield by means of the third oblique shield.

7. The wheel hub assembly of claim 6, wherein an access gate between the fourth shield and a flange portion of the first hub has an axial dimension of less than or equal to 1.0 mm.

8. The wheel hub assembly of claim 7, wherein the access gate has an axial dimension of less than or equal to 0.5 mm.

9. A wheel hub assembly for motor vehicles comprising:
a stationary hub,
a rotatable hub, and
a bearing unit comprising:
a radially outer ring provided with respective radially outer raceways and mounted on the rotatable hub,
at least one radially inner ring provided with respective radially internal raceways and mounted on the stationary rotatable hub,
at least one row of rolling bodies, positioned between the corresponding internal and external raceways,
at least one sealing device, positioned on an axially inner position with respect to the at least one row of rolling bodies,
wherein on the rotatable hub a metal deflector is mounted by interference and configured to allow water to drain and protect the area of the at least one sealing device from the external contaminant, further wherein said deflector is mounted on a radially inner diameter of the rotatable hub, in an axially inner position with respect to the rotatable hub; and
wherein said deflector comprises a first cylindrical shield configured to be mounted by interference on the second hub and radially aligned with the inner diameter of the radially outer ring, a second shield comprising a radially extending flange portion, connected to the first cylindrical shield and configured to provide the deflector with a stop surface against a surface of the radially outer ring, a third oblique shield, integrally connected to the second shield and a fourth shield, connected to the third shield, in an axially inner position with respect to the first shield, the second shield and the third shield.

10. The wheel hub assembly of claim 9, wherein between the at least one sealing device and the first cylindrical shield of the deflector there is an axial clearance having a value greater than 1 mm.

11. The wheel hub assembly of claim 9, wherein the inner diameter of the deflector is smaller than the outer diameter of the at least one sealing device.

12. The wheel hub assembly of claim 9, wherein a portion of the surface on which the contact between the radially outer ring and the second shield of the deflector occurs has a radial development greater than or equal to 1 mm.

13. The wheel hub assembly of claim 9, wherein a thickness of the shields of the deflector is between 0.5 and 1 mm, a radial interference is between 0.06 and 0.24 mm and a press-fitting length of the first cylindrical shield in the inner diameter of the radially outer ring has a value greater than or equal to 1.5 mm.

14. The wheel hub assembly of claim 9, wherein the fourth shield is fixed in an axially inner position with respect to the other shields of the deflector, said position being obtained by axially distancing the fourth shield from the second shield by means of the third oblique shield.

15. A wheel hub assembly for motor vehicles, comprising:
a stationary first hub,
a rotatable second hub, and
a bearing unit comprising:
 a radially outer ring provided with respective radially outer raceways and mounted on the rotatable second hub,
 at least one radially inner ring provided with respective radially internal raceways and mounted on the stationary first hub,
 at least one row of rolling bodies, positioned between the corresponding internal and external raceways,
 at least one sealing device, positioned on an axially inner position with respect to the at least one row of rolling bodies,
wherein on the second hub a metal deflector is mounted by interference and configured to allow water to drain and protect the area of the at least one sealing device from the external contaminant, wherein said deflector comprises a first cylindrical shield configured to be mounted by interference on the second hub and radially aligned with the inner diameter of the radially outer ring, a second shield comprising a radially extending flange portion, connected to the first cylindrical shield and configured to provide the deflector with a stop surface against a surface of the radially outer ring, a third oblique shield, integrally connected to the second shield and a fourth shield, connected to the third shield, in an axially inner position with respect to the first shield, the second shield and the third shield, further wherein between the at least one sealing device and the first cylindrical shield of the deflector there is an axial clearance having a value greater than 1 mm, further wherein a portion of the surface on which the contact between the radially outer ring and the second shield of the deflector occurs has a radial development greater than or equal to 1 mm, further wherein a thickness of the shields of the deflector is between 0.5 and 1 mm, a radial interference is between 0.1 and 0.2 mm and a press-fitting length of the first cylindrical shield in the inner diameter of the radially outer ring has a value greater than or equal to 1.5 mm, further wherein the fourth shield is fixed in an axially inner position with respect to the other shields of the deflector, said position being obtained by axially distancing the fourth shield from the second shield by means of the third oblique shield, further wherein an access gate between the fourth shield and a flange portion of the first hub has an axial dimension of less than or equal to 1 mm, and further wherein the access gate has an axial dimension of less than or equal to half of 1 mm.

\* \* \* \* \*